(12) United States Patent  
Gell et al.

(10) Patent No.: US 8,205,896 B2  
(45) Date of Patent: Jun. 26, 2012

(54) INDEPENDENT WHEEL SUSPENSION

(75) Inventors: Klaus Gell, Obernzell (DE); Ulrich Solka, Feurstenzell (DE); Hans Wimmer, Neuburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 136 days.

(21) Appl. No.: 12/741,487

(22) PCT Filed: Oct. 22, 2008

(86) PCT No.: PCT/EP2008/064251  
§ 371 (c)(1),  
(2), (4) Date: May 5, 2010

(87) PCT Pub. No.: WO2009/062824  
PCT Pub. Date: May 22, 2009

(65) Prior Publication Data  
US 2010/0264616 A1    Oct. 21, 2010

(30) Foreign Application Priority Data  
Nov. 15, 2007  (DE) .......................... 10 2007 047 788

(51) Int. Cl.  
*B60G 3/20* (2006.01)  
*B62D 7/18* (2006.01)

(52) U.S. Cl. ............................. 280/93.512; 280/124.135

(58) Field of Classification Search ............. 280/93.512, 280/124.125, 124.134, 124.135, 124.136, 280/124.139, 124.143; 403/341, 354, 364  
See application file for complete search history.

(56) References Cited

U.S. PATENT DOCUMENTS

| 1,173,289 A * | 2/1916 | McKee et al. ................... 74/439 |
| 1,547,759 A * | 7/1925 | Journeay ......................... 285/85 |
| 2,057,372 A * | 10/1936 | Douglas et al. ............... 384/535 |
| 2,114,127 A * | 4/1938 | Neuberth ....................... 403/331 |
| 3,092,403 A * | 6/1963 | Gerdeman ...................... 285/86 |
| 4,286,799 A | 9/1981 | Ayres |
| 5,098,216 A * | 3/1992 | Caperton ...................... 403/341 |
| 5,143,477 A * | 9/1992 | Kanehira et al. .............. 403/341 |

(Continued)

FOREIGN PATENT DOCUMENTS

DE          943 930          5/1956

(Continued)

OTHER PUBLICATIONS

Machine Translation of WO2005091699A1.*

*Primary Examiner* — Joseph Rocca  
(74) *Attorney, Agent, or Firm* — Davis & Bujold, P.L.L.C.

(57) ABSTRACT

An independent wheel suspension with a rotating steering knuckle which supports itself on a spring carrier is connected with the vehicle frame via a damper. The steering knuckle is connected with the spring carrier via a kingpin, and the wheel suspension has upper and lower transverse links which are positioned at the upper or lower ends of the kingpin. The steering knuckle and the transverse links are pivotally positioned relative to the kingpin and the spring carrier is connected with the kingpin in a rotationally fixed manner. The kingpin connects the spring carrier, the steering knuckle, and the upper end lower transverse links and is a two-piece part which comprises upper and lower parts. Axially, radially and rotationally fixing the upper and the lower parts and the spring carrier is achieved by a combination of the upper and the lower parts with the spring carrier.

14 Claims, 9 Drawing Sheets

U.S. PATENT DOCUMENTS

| | | | | |
|---|---|---|---|---|
| 5,582,489 | A | * | 12/1996 | Marzio et al. ................ 403/354 |
| 5,709,399 | A | * | 1/1998 | Smith, Jr. ................ 280/93.512 |
| 5,722,784 | A | * | 3/1998 | Link ............................ 403/158 |
| 5,950,744 | A | * | 9/1999 | Hughes ........................ 175/320 |
| 6,071,032 | A | * | 6/2000 | Link ............................ 403/158 |
| 6,505,857 | B2 | * | 1/2003 | Fosse et al. ................... 280/779 |
| 6,877,927 | B2 | * | 4/2005 | Paulin et al. ................. 403/341 |

FOREIGN PATENT DOCUMENTS

| | | |
|---|---|---|
| DE | 30 34 092 A1 | 4/1981 |
| DE | 100 30 028 A1 | 12/2001 |
| DE | 102 52 135 A1 | 5/2004 |
| DE | 10 2004 014 555 A1 | 12/2005 |
| EP | 1 837 210 A1 | 9/2007 |
| WO | 2005/091699 A1 | 10/2005 |

* cited by examiner

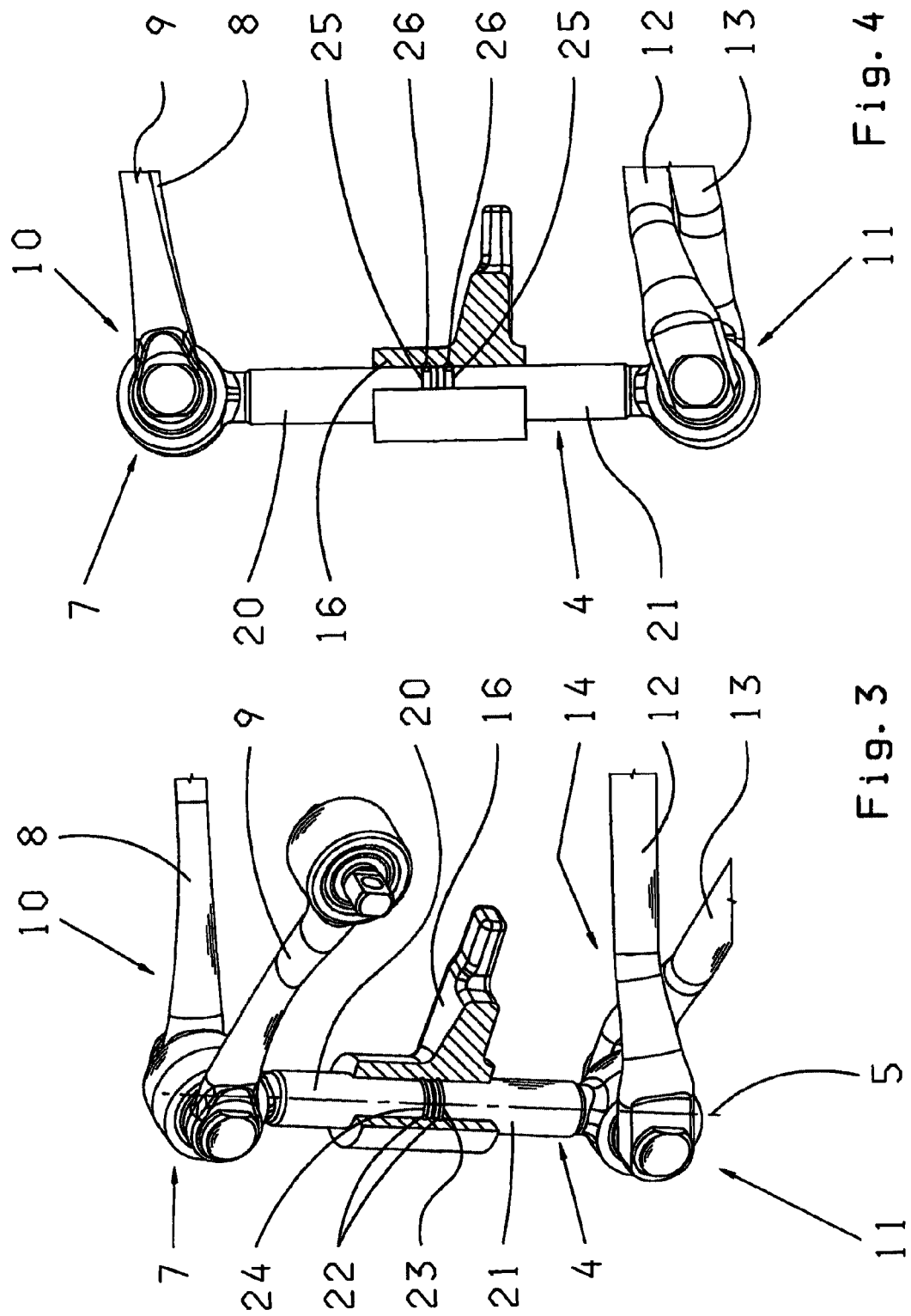

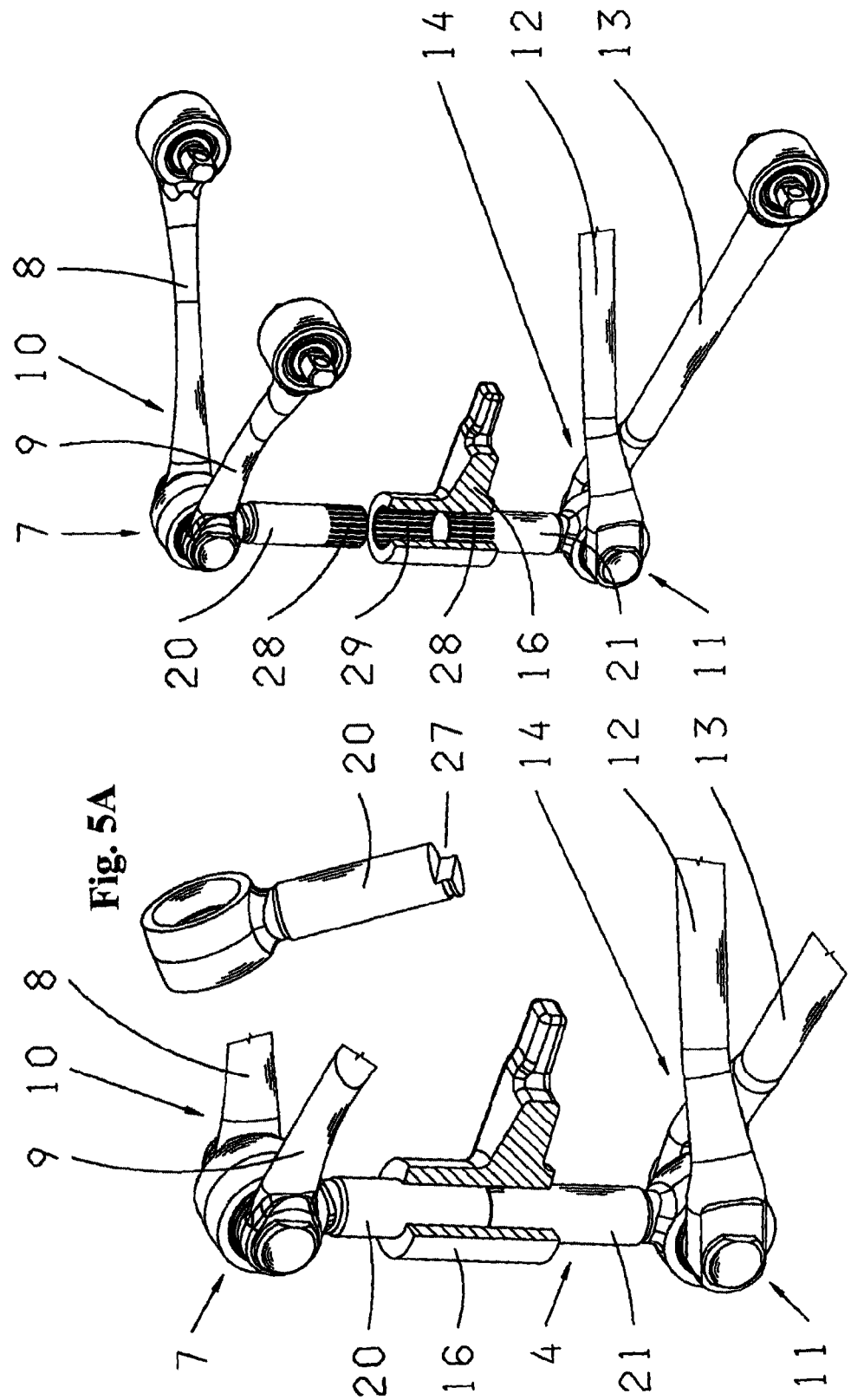

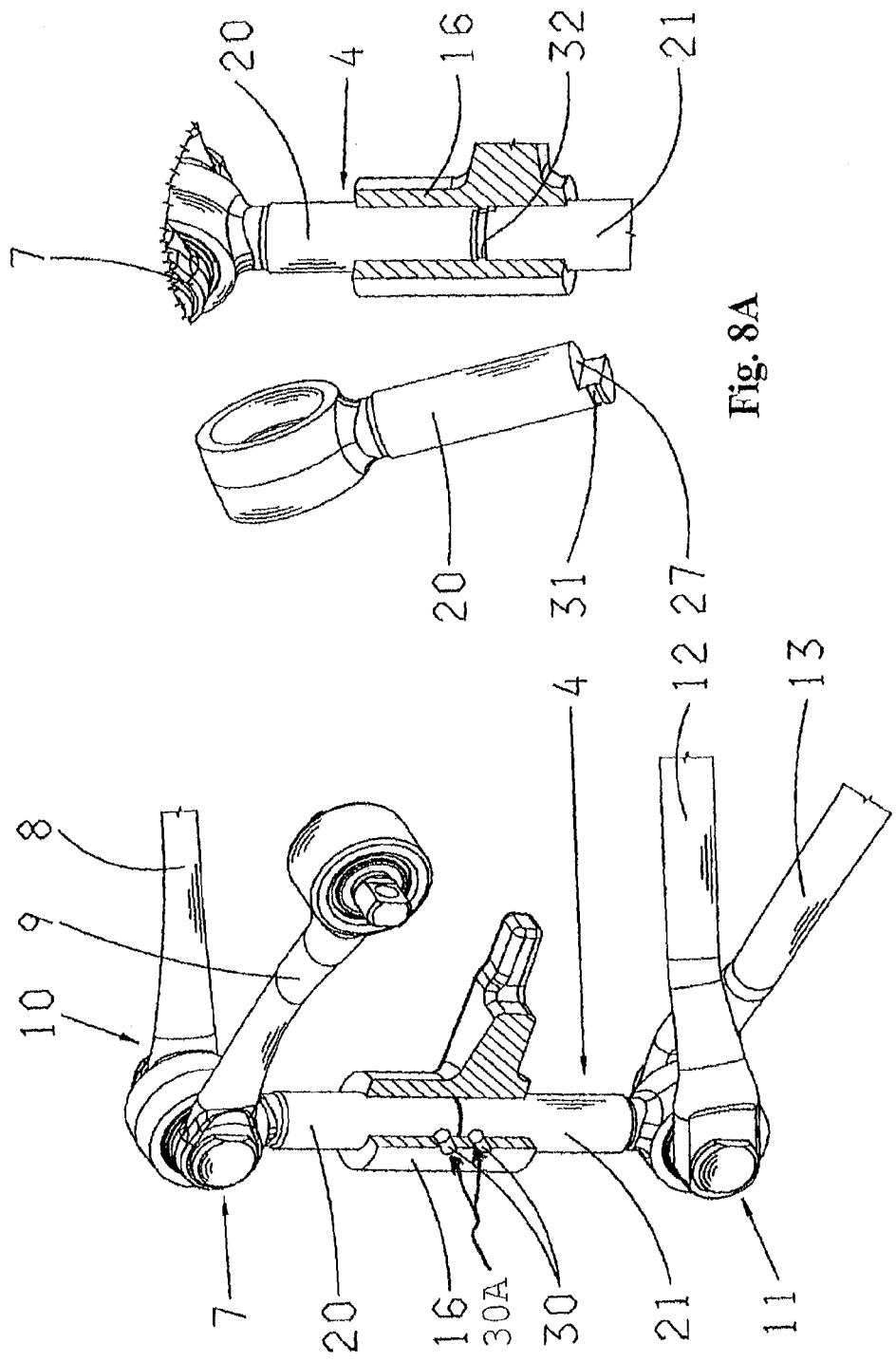

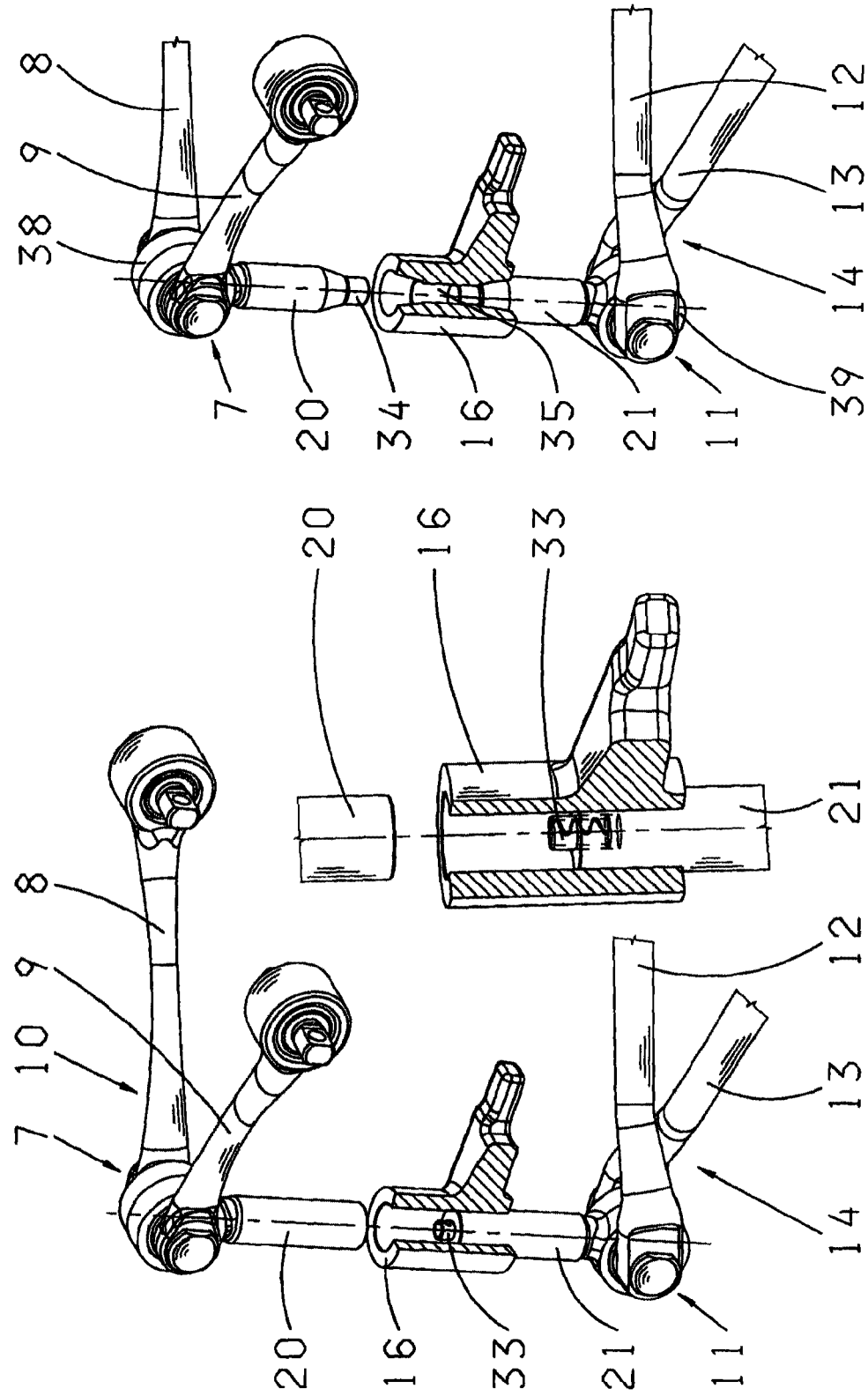

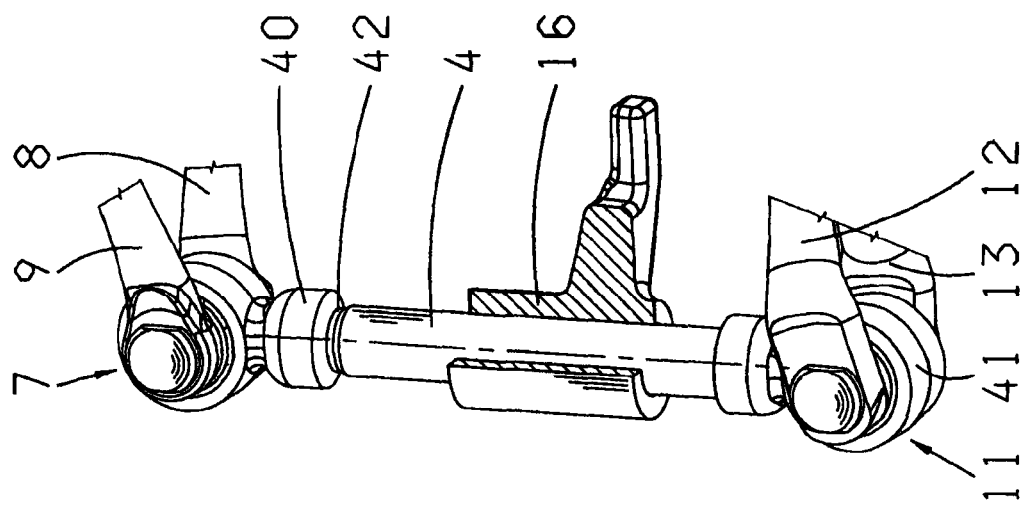
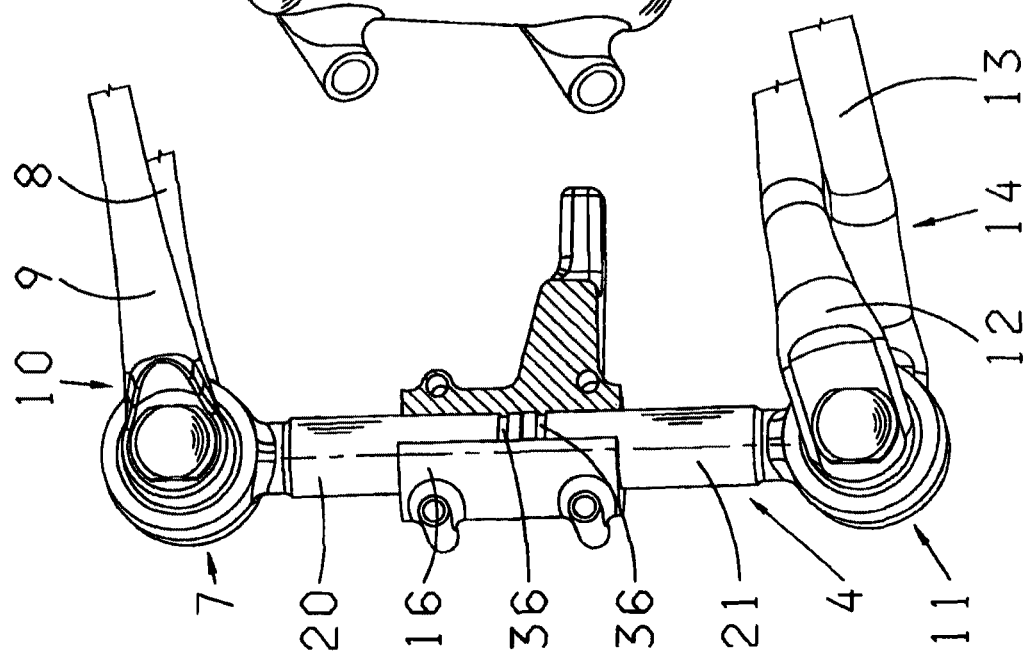

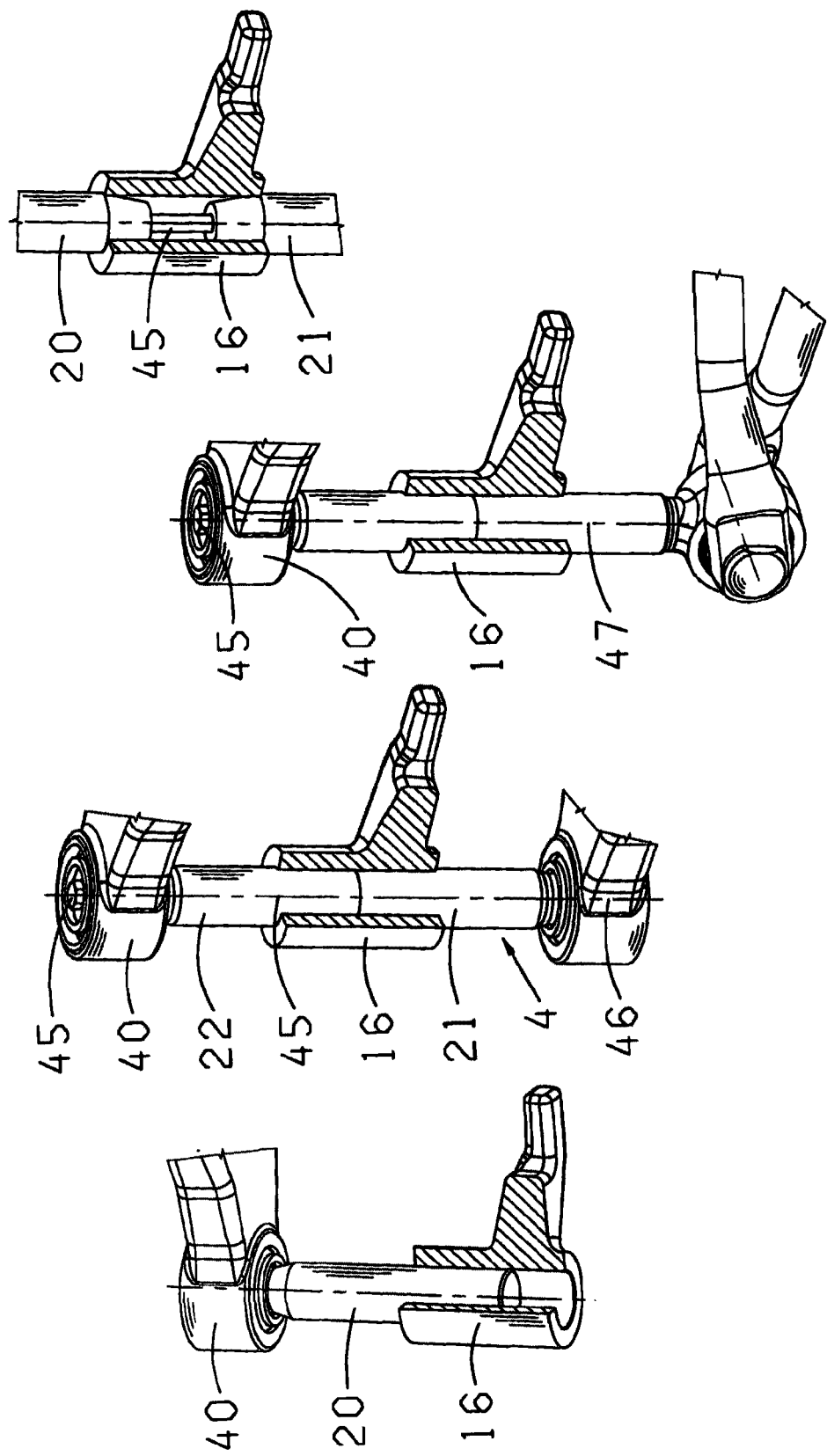

INDEPENDENT WHEEL SUSPENSION

This application is a National Stage completion of PCT/EP2008/064251 filed Oct. 22, 2008, which claims priority from German patent application serial no. 10 2007 047 788.2 filed Nov. 15, 2007.

FIELD OF THE INVENTION

The present invention relates to an independent wheel suspension.

BACKGROUND OF THE INVENTION

Known to the applicant, for instance through WO 2005/091699 A1, is an independent wheel suspension for a steerable vehicle wheel, with a steering knuckle which is rotatably positioned around a rotation axis and which is supported by a carrier, whereby the carrier is linked with the vehicle chassis through a spring-damper-module.

The known wheel suspension comprises a coaxially positioned kingpin, in reference to the axis of rotation, at least an upper transverse link and at least a lower transverse link, the transversal links are connected with the vehicle chassis and through at least one connecting part with the steering knuckle. In accordance with WO 2005/091699 A1, the carrier is connected with the steering knuckle through a coaxially positioned bearing, in reference to the rotation axis, the joining means are positioned coaxial with reference to the rotation axis, and the transverse links are connected with the joining means.

In addition, the applicant knows through DE 10 2004 014 555 A1 a suspension for a steerable vehicle wheel with a steering knuckle, rotatably positioned around a rotation axis, which is linked via a steering knuckle with an upper transverse link and a lower transverse link, with an upper transverse link joint and a lower transverse link joint, through which the transverse links are connected with the steering knuckles, at least one transverse link has a section at the transverse link joint, in which the width of the transverse link remains nearly the same or becomes narrower. Preferably, this section is achieved through crossing transverse links or penetrating transverse links.

Also known to the applicant, through DE 100 30 028 A1, is a wheel suspension for a steered wheel of a motor vehicle. The known wheel suspension comprises a wheel carrier which is connected with the chassis of the motor vehicle via the upper steering rods and the lower steering rods, and the wheel carrier is directly connected with a spring carrier. Hereby, the spring carrier is rotatably positioned in the wheel carrier, such that, through the use of the bolt, which is on one hand connected with the spring carrier and on the other hand with the wheel carrier, a compact wheel suspension is realized.

Within the scope of DE 102 52 135 A1, the applicant knows about a publication of an independent wheel suspension for a motor vehicle, especially for commercial vehicles, comprising axis transverse links and axis trailing arms, in which at least the most stressed rods and bars of the transverse links and trailing arms possess in each section and elliptical cross section.

SUMMARY OF THE INVENTION

It is the task of the present invention, based on the mentioned state of the art, to present an independent wheel suspension, in which the kingpin is optimized in reference to the functionality, and to realize in a simple way the axial and/or radial fixation between the spring carrier and the kingpin by itself or between one another.

Thus, an independent wheel suspension this proposed, which has a steering knuckle, rotatably positioned in reference to a rotating axis, which supports itself on a spring carrier, which is connected, via a damper or an air spring, or a spring-damper-module with the vehicle frame, the steering knuckle being connected with the spring carrier via a kingpin.

Hereby, the independent wheel suspension comprises at least an upper transverse link and at least a lower transverse link, the transverse links are hinged at the upper end, or the lower end, respectively, of the kingpin, and the spring carrier is connected to the kingpin in a rotationally fixed manner.

In accordance with a first inventive embodiment of an independent wheel suspension, the kingpin is designed in two parts and comprises an upper part and a lower part, with the axial and/or radial fixation and/or twist protection between the parts, and/or in relationship to the spring carrier, taking place through interaction with the spring carrier.

BRIEF DESCRIPTION OF THE DRAWINGS

In the following, the invention will be exemplary explained in greater detail based on the included drawings, in which the same parts are marked with the same reference characters. It is shown in:

FIG. 3 a perspective view of an inventive embodiment of the kingpin;

FIG. 4 a perspective view of another inventive embodiment of the kingpin;

FIGS. 5, 5A views of an advantageous inventive embodiment of the kingpin;

FIG. 6 a view of an additional, advantageous inventive embodiment of the kingpin and its connection to the spring carrier;

FIG. 7 a perspective view of an additional, advantageous inventive embodiment of the kingpin and its connection to the spring carrier;

FIGS. 8, 8A perspective views of the inventive embodiment of the kingpin and its connection to the spring carrier;

FIGS. 9, 9A perspective views of an additional, advantageous embodiment of the kingpin and its connection to the spring carrier;

FIG. 10 a view of an advantageous inventive embodiment of the kingpin, as well as its connection to the spring carrier;

FIGS. 11, 11A views of and additional, advantageous inventive embodiment of the kingpin and its connection to the spring carrier;

FIG. 12 a perspective view of the kingpin;

FIG. 15 a view open additional, advantageous inventive embodiment of the kingpin and its connection to the transversal link joints;

FIG. 16 a view of an additional, advantageous inventive embodiment of the kingpin;

FIG. 17 a perspective view of an additional, advantageous inventive embodiment of the kingpin and its connection to the transversal link joints; and FIG. 18 a view of an additional, advantageous inventive embodiment of the kingpin.

DETAILED DESCRIPTION OF THE PREFERRED EMBODIMENTS

Figure 1:
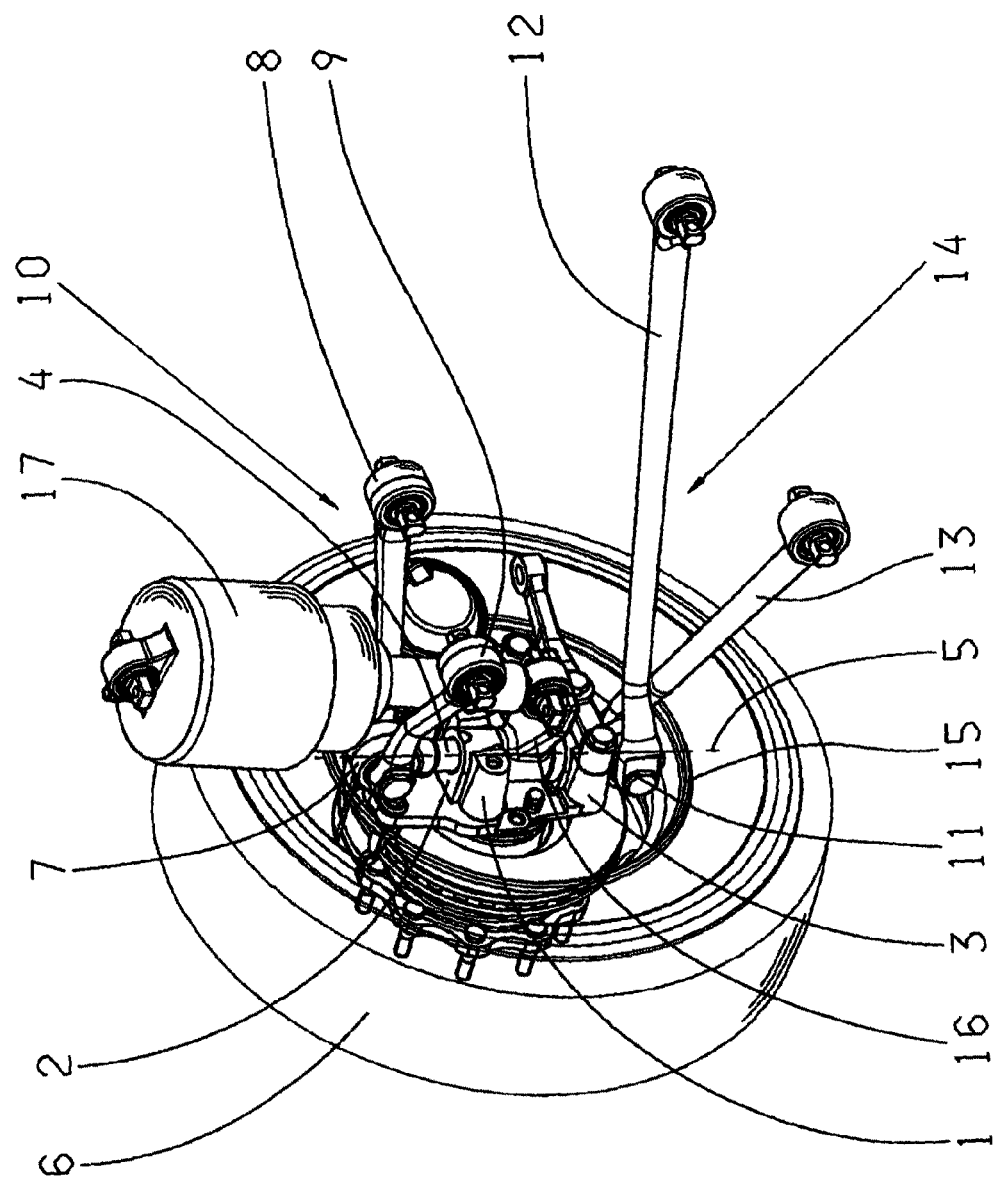
FIG. 1 a schematic view of an independent wheel suspension in accordance with WO 2005/091699 A1 by the applicant, comprising an air spring-damper-module.

FIG. 1 schematically presents an independent wheel suspension in accordance with WO 2005/091699 A1 by the applicant, comprising a spring-damper-module.

Hereby, the steering knuckle 1 comprises an upper receptacle 2 and a lower receptacle 3, in which a steering knuckle 4 is located, which is positioned coaxial in reference to a rotating axis 5. Hereby, the steering knuckle 1 can rotate around the axis 5, to perform steering movements for the vehicle wheel 6.

In the example shown in FIG. 1, the steering knuckle 4 has at its upper end a joint 7, which can be designed as a roller bearing, shift bearing, ball joint, or as a molecular joint, and through which a first arm 8 and a second arm 9 of an upper transverse 10 link are connected. In addition, the kingpin 4 has a joint 11 at its lower end, which can be designed like the joint 7, and through which a first arm 12 and the second arm 13 of a lower transverse link 14 are connected. By connecting the upper transverse link 10 and the lower transverse link 14 directly with the kingpin 4, the transverse link is extended, which leads to an improvement of the spring kinematics. Preferably, the joints 7 and 11 are positioned in the rim 15.

Between the upper receptacle 2 and the lower receptacle 3, a carrier is positioned, or spring carrier 16, respectively, which is connected with a spring-damper-module 17, so that the steering knuckle 1 supports itself via the spring carrier, or carrier 16, respectively, and via the spring-damper-module 17 at a non-shown vehicle frame. The first arm 8 and the second arm 9, as well as the first arm 12 and the second arm 13, are also hinged at a non-shown vehicle frame. As seen in FIG. 1, the first arm 12 and the second arm 13 are positioned to cross such that the possible steering angle can be increased. Hereby, the spring-damper-module 17 is positioned outside of the vehicle frame and above the upper transverse link 10.

Figure 2:
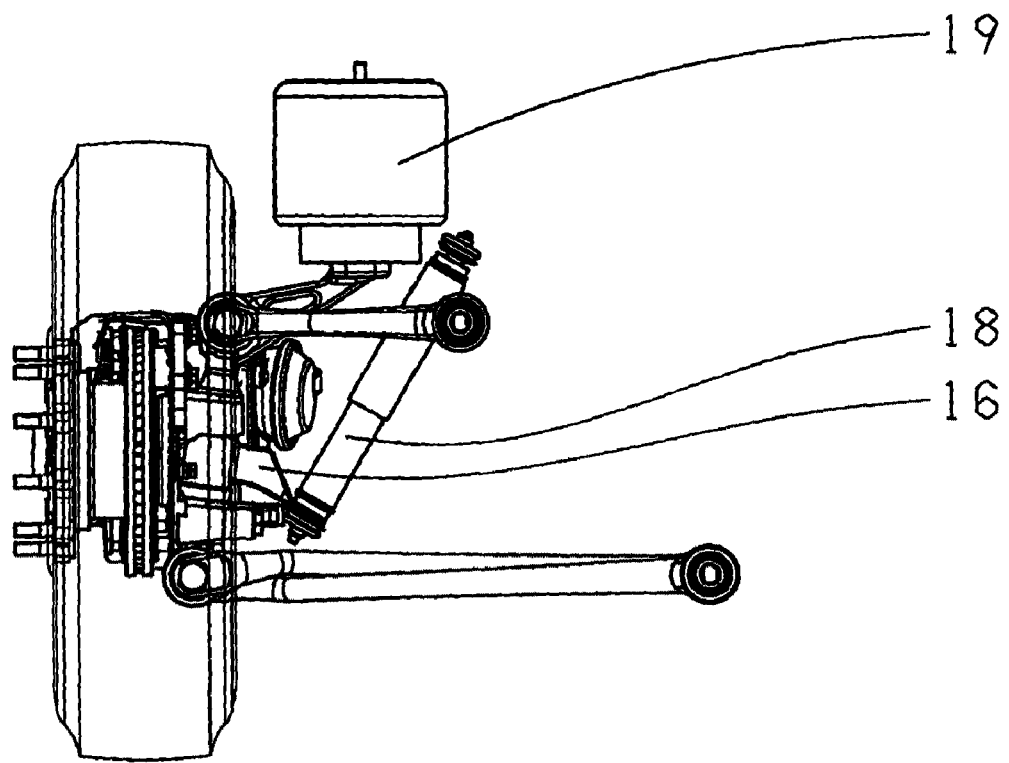
FIG. 2 a schematic view of an independent wheel suspension in accordance with WO 2005/091699 A1 by the applicant, comprising an air spring and a damper.

In FIG. 2 a wheel suspension is shown, were the principal construction is similar to the construction shown for the wheel suspension in FIG. 1, with the difference that, instead of the spring-damper-module 17, a separate damper 18 end a separate air spring 19 are used. Also in this case, the air spring 19 is positioned outside of the vehicle frame and above the upper transverse link 10. In the shown examples, the support of the wheel contact force towards the carrier or spring carrier 16, and therefore towards the vehicle frame is realized through an axial bearing.

FIG. 3 presents a detailed view of the inventive kingpin of a independent wheel suspension, comprising a steering knuckle, rotatable around a rotation axis 5, which supports itself on a spring carrier 16, which is connected with the vehicle frame through a damper and an air spring, or through a spring-damper-module, with the steering knuckle being connected with the spring carrier through a kingpin 4. The independent wheel suspension has at least an upper transverse link 10 and a lower transverse link 14, with the transverse links being hinged at the upper end, or lower end, respectively, of the kingpin 4, and the steering knuckles and the transverse links 10, 14 being swivel-mounted with the kingpin 5, and the spring carrier 16 is connected in a rotationally fixed manner with the kingpin.

In FIG. 3, as well as in the following drawings and for the better understanding of the invention, the steering knuckle is not shown. In the drawings, the joint of the upper transverse link 10, which has two transverse link arms 8, 9 has the reference character 7, and the joint of the lower transverse link 14, which comprises two transverse link arms 12, 13, has the reference character 11.

In the example shown in FIG. 3, the kingpin 4 is a two-piece design and has an upper part 20 and a lower part 21, with the axial fixation between the parts 20, 21 of the kingpin 4 and between the spring carrier 16 being realized by means of snap rings 22, and for this purpose, two ring grooves 23 are provided, and in the parts 20, 21, each has a ring groove 24 for the accommodation of the snap rings 22.

Preferably, the parts 20, 21 of the kingpin are identically designed in its two-piece configuration, whereby, depending on the construction, different embodiments of the parts 20, 21 can be combined with each other.

In principle, axial and radial fixation between the parts 20, 21, in regard to the spring carrier 16 or also between each other, can be realized through the use of a press-fit.

FIG. 4 shows an additional embodiment of the axial fixation between the parts 20, 21 of the kingpin 4 between each other and in regard to the spring carrier 16, where the fixation is realized by means of pins or screws or similar, and for this purpose, the parts 20, 21 each have a ring groove 25 and the spring carrier 16 has corresponding boreholes 26 for the pins and screws.

The example in FIG. 5 shows the possibility of preventing twist between the parts 20, 21, when designed as a two-piece kingpin 4. Hereby, each part 20, 21 has at its end, facing the other part, a notch 27, in the assembled state, the parts 20, 21 are twisted in a way so that they mesh via the notches 27. A part 20, having the notch 27, is shown in FIG. 5A. The axial fixation between the parts 20, 21 of the kingpin 4 and between the spring carrier 16 can, for instance, be realized through the concepts as shown in FIGS. 3 and 4.

Furthermore, FIG. 6 discloses an additional possibility for preventing twist, or facilitating radial fixation between the parts 20, 21 for a two-piece designed kingpin 4 and between the spring carrier 16. Hereby, twist prevention, or radial fixation between the parts 20, 21 and the spring carrier 16 is realized through external toothing 28 of the parts 20, 21 and interacting, corresponding inner toothing 29 of the spring carrier 16.

The example shown in FIG. 7 is an embodiment for the axial and radial fixation between the parts 20, 21 of the kingpin 4 and the spring carrier 16, in which the fixation is realized through the locking elements 30A, such as pins, screws, or similar, which are inserted through openings 30 and intersect both the spring carrier 16 and first and second parts 20, 21 and through which the spring carrier 16 is connected with the parts 20, 21.

FIG. 8:

The axial and radial fixation between the parts 20, 21 of the kingpin 4 and the spring carrier 16 can also be realized through notches and ring grooves. Hereby, each part 20, 21 has at its end, facing the other part, a notch 27, when in the assembled state, the parts 20, 21 are twisted in a way so that the notches 27 mesh with each other.

In addition and as shown in FIG. 8A, each part 20, 21 has in the area, where no notch is present, a circumferential groove 31, whereby, in the assembled state, the right part in FIG. 8 becomes the matter, where the circumferential grooves of both parts result in a continuous ring groove, into which a provided bar 32 at the spring carrier 16 engages. Preferably and in this case it is provided that, for the purpose of the assembly, the spring carrier 16 is designed as a two-piece part, whereby the two pieces are connected with each other after the assembly, for instance through screw joints, resulting in a continuous bar 32. For example, each part of the two-piece designed spring carrier 16, in the area around the kingpin 4, can be configured as a half cylinder. Parts 20 and 21 and spring carrier 16 may also be secured to each other by locking elements 30A inserted into openings 30 through parts 20 and 21 and spring carrier 16, in the manner shown in FIG. 7.

FIG. 9 shows an example in which the radial fixation between the parts 20, 21 of the kingpin 4 is achieved through a pin 33, engaging with both parts. FIG. 9A is a detailed view of the area around the spring carrier 16, whereby, for a better understanding, the pin 33, which engages with the part 21, is indicated.

Furthermore, FIG. 10 shows an additional possibility for axially and radially fixing of the parts 20, 21 of a two-piece designed kingpin 4 in the spring carrier 16. Hereby, the fixation is realized through a provided thread 34, which jointly interacts with the inner thread 35 of the spring carrier 16. Preferably, the area close to the thread 36 of each part 20, 21 is designed as a truncated cone, whereby, in conjunction with the respectively designed spring carrier 16, the required play is guaranteed in the assembled state.

The example in FIG. 11 shows an embodiment for axially and radially fixing the parts 20, 21 of the kingpin 4 and the spring carrier 16, were the axial and the radial fixation is realized through clamping when screwing together of the two-piece configured spring carrier 16, whereby each part of the two-piece configured spring carrier 16 can be designed as a half cylinder in the area around kingpin 4.

An additional axial fixation can be realized, as shown in FIG. 11, by having a ring groove 36 on each part 20, 21, at its end which is facing the other part, into which a bar 37 of the spring carrier 16 engages, whereby two continuous bars 37 are established when joining the two parts of the spring carrier 16. The bars 37 are shown in FIG. 11A.

In the embodiment examples, as shown in FIGS. 3 to 11, where the kingpin 4 is designed as a two-piece part, the transverse link joints 7, 11 of the upper and the lower transverse link 10, 14 are designed as roller bearings, whereby the end of the parts 20, 21 of the kingpin 4, facing away from the spring carrier, each has a housing or a joint head, respectively, for the transverse link joints 7, 11, which is preferably designed as a one-piece part with the respective part 20, 21. The joint housings are indicated in FIG. 10 with the reference characters 38 and 39.

In a one-piece part configuration of the kingpin 4, the transverse link joints 7, 11 can be designed as ball bearings or molecular bearings, whereby it is also possible to have an embodiment of the transverse link joints 7, 11, of the upper and lower transverse link 10, 14, as a roller bearing, as shown in FIG. 12.

The kingpin 4 is here in designed as a one-piece part, whereby the joint heads 40, 41, for the transverse link joints 7, 11, are designed as separate parts, and which can be connected at the kingpin 4 through, for example, a threaded socket 42, whereby the end of the kingpin 4, facing the joint head, is preferably designed as a truncated cone to enable a larger play. In accordance with the invention, just one joint head 40, 41 can be designed as a separate part.

FIG. 11

In the shown embodiment, axial fixation and twist prevention between the spring carrier 16 at the kingpin 4 is realized by clamping with the screw joints of the two-piece design spring carrier 16, whereby and additional axial fixation can be realized through a ring groove on the kingpin 4, into which a bar of the spring carrier 16 engages, which results, when joining the two parts of the spring carrier together, in a continuous bar.

Figure 13:
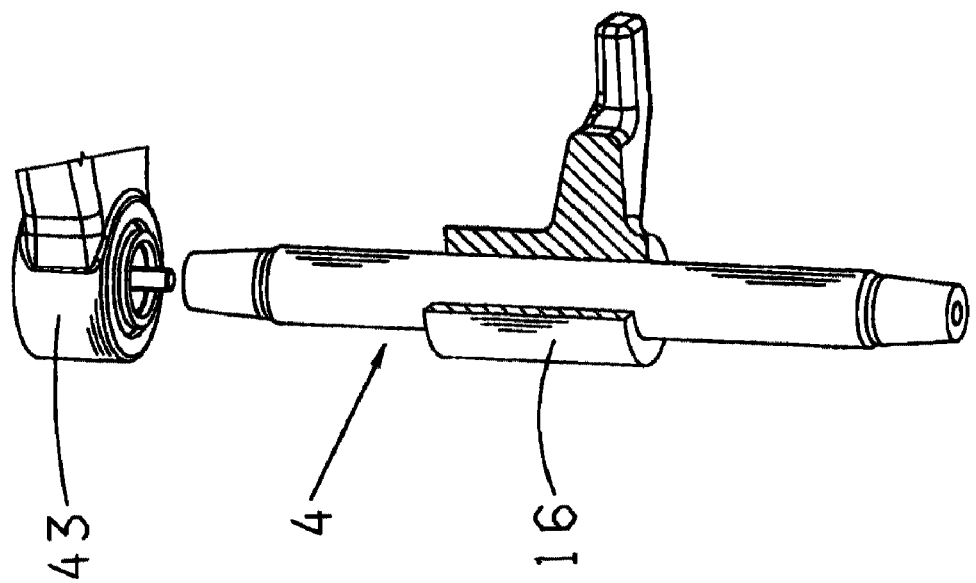
FIG. 13 a perspective view of an advantageous inventive embodiment of the kingpin and its connection to the transversal link joints.

FIG. 13 presents an embodiment, where the kingpin 4 is designed as a one-piece part, whereby the transverse link joints 7, 11 can be designed as ball joint or molecular joint 43, which are screwed on to the respective end of the kingpin 4.

Figure 14:
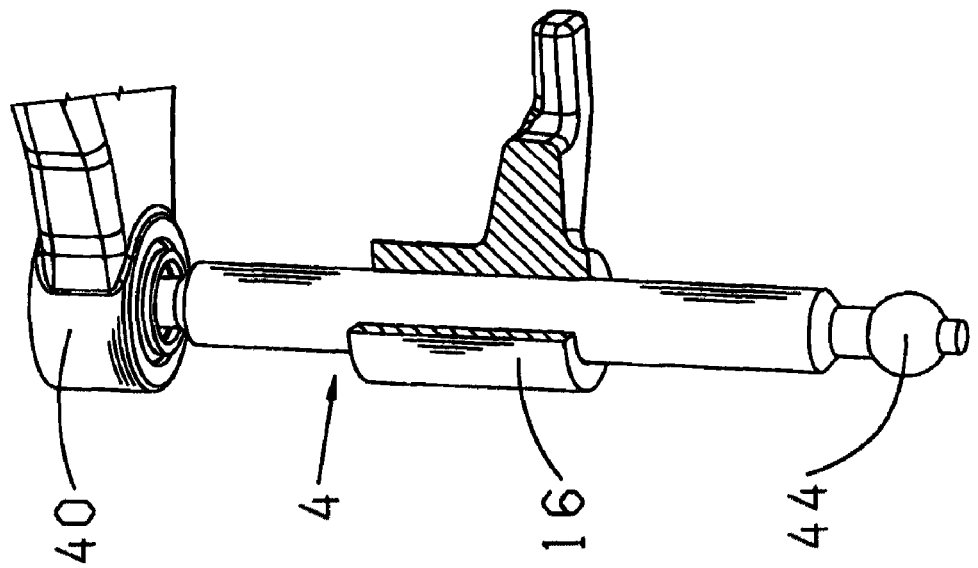
FIG. 14 a perspective view of an additional, advantageous inventive embodiment of the kingpin and its connection to the transversal link joints.

In the example of the embodiment shown in FIG. 14, the kingpin 4 is designed as a one-piece part, whereby a ball joint head or molecular joint head 44 is integrated at the end of the kingpin 4, whereby the joint assembly happens with the transverse link assembly. FIG. 14 shows the upper joint head 40 in the assembled state, whereby, at the other end of the kingpin 4, the integrated ball joint head or molecular joint head 44 is shown prior to the joint assembly.

In accordance with the invention and referring to FIG. 15, the kingpin 4 can be designed as a two-piece part, whereby into the end of the part 20 or 21, respectively, of the kingpin 4, facing the respective transverse link 10, 14, a ball or molecular joint head 44 is integrated. In the shown example, the upper joint head 40 is presented in the assembled state. Hereby, the axial and/or radial fixation and/or twist protection between the parts 20, 21 or between the spring carrier 16, can be provided in accordance with the above mentioned concepts.

Also, within the scope of an advantageous extension of the embodiment as shown in FIG. 15 and which is the subject of FIG. 16, a through bolt 45 with a nut 46 can be provided, through which the two parts 20, 21 of the kingpin 4 can be connected with each other. As an alternative to the embodiment with the screw nut 46, the screw 45, which extends through the first part 20, can be screwed into the thread 47 of the second part 21 of the kingpin 4, as presented in FIG. 17. An additional axial and/or radial fixation can be realized, for example, by clamping when screwing together the spring carrier which is designed as a two-piece part.

In addition, in the case of a two-piece part designed kingpin 4, the axial fixation between the two parts 20, 21 and between the spring carrier 16 can be realized when the ends of the parts 20, 21, positioned in the spring carrier 16, are designed as truncated cone and are positioned form-locking in the spring carrier, whereby the two parts 20, 21 are screwed together by means of a through bolt 45 with a nut. Alternatively, the through bolt 45, which extends through the first part, can also be screwed into a thread of the second part 21 of the kingpin 4.

Naturally, every constructive embodiment, especially each spatial configuration of the parts in the inventive independent wheel suspension, in itself and where technically realistic, is considered as protected by the presented claims, without affecting the function of the individual wheel suspension, as mentioned in the claims, even if the embodiment is not explicitly presented in the drawings or the specification.

REFERENCE CHARACTERS

1 Steering Knuckle
2 Receptacle
3 Receptacle
4 Kingpin
5 Rotation Axis
6 Vehicle Wheel
7 Joint
8 Transverse Link Arm
9 Transverse Link Arm
10 Transverse Link
11 Joint 12 Transverse Link Arm
13 Transverse Link Arm
14 Transverse Link
15 Rim
16 Support, Spring Carrier
17 Spring-Damper-Module
18 Damper
19 Air Spring
20 Upper part of the kingpin
21 Lower part of the kingpin
22 Snap Ring
23 Ring Groove
24 Ring Groove
25 Ring Groove
26 Borehole
27 Notch
28 Outer Tooth System
29 Inner Tooth System
30 Pin
31 Circumferential Groove
32 Bar
33 Pin
34 Threads
35 Inner Thread
36 Ring Groove
37 Bar
38 Joint Housing
39 Joint Housing
40 Joint Head
41 Joint Head
42 Thread Socket
43 Ball or Molecular Joint
44 Ball or Molecular Joint
45 Through Bolt
46 Nut
47 Thread

The invention claimed is:

1. An independent wheel suspension with a steering knuckle (1) which rotates about a rotational axis (5) and is supported on a spring carrier (16), which is connected with a frame of a vehicle via one of a damper (18) and an air spring (19) or a spring-damper-module (17), the steering knuckle (1) being connected with the spring carrier (16) via a kingpin (4), the independent wheel suspension comprises at least an upper transverse link (10), positioned at an upper end of the kingpin (4), and at least a lower transverse link (14), positioned at a lower end of the kingpin (4), the steering knuckle (1) and the upper and the lower transverse links (10, 14) being pivotally positioned relative to the kingpin (4), and the spring carrier (16) being connected with the kingpin (4) in a rotationally fixed manner, the kingpin (4) being a connecting link for the spring carrier (16), the steering knuckle (1), and the upper and the lower transverse links (10, 14), the kingpin (4) being a two-piece part comprising an upper part (20) and a lower part (21), at least an end of the upper part (20), adjacent the lower part (21), and an end of the lower part (21), adjacent the upper part (20), being enclosed within an axial cylindrical opening within the spring carrier (16)

the end of the upper part (20), adjacent the lower part (21), having a first notch (27) and the end of the lower part (21), adjacent the upper part (20), having a second notch (27) with the first and second notches (27) being correspondingly shaped to engage with each when the upper part (20) and the lower part (21) are rotationally oriented with respect to each other to engage the first notch (27) with the second notch (27), the upper part (20) and the lower part (21) thereby being rotationally fixed with respect to each other and preventing axial twisting between the upper part (20) and the lower part (21), and the end of the upper part (20), adjacent the lower part (21), and the end of the lower part (21), adjacent the upper part (21), each having a circumferential groove (31) in an area not having a notch (27), and the spring carrier (16) including a first inwardly extending bar (32) engaging with the circumferential groove (31) in the end of the upper part (20), adjacent the lower part (21), and a second inwardly extending bar (32) engaging with the circumferential groove (31), the end of the lower part (21), adjacent the upper part (21), thereby axially fixing the upper part (20) and the lower part (21) with respect to each other and with respect to the spring carrier (16).

2. The independent wheel suspension according to claim 1, wherein snap rings (22) facilitate axially fixing of the upper and the lower parts (20, 21) between the kingpin (4) and between the spring carrier (16), two ring grooves (23) are provided in the spring carrier (16), and one ring groove (24) is provided in each of the upper and the lower parts (20, 21) to accommodate the snap rings (22).

3. The independent wheel suspension according to claim 1, wherein axial fixation between the upper and the lower parts (20, 21) of the kingpin (4) and between the spring carrier (16) is achieved by pins or screws, and the spring carrier (16) has corresponding boreholes (26) for the pins or screws.

4. The independent wheel suspension according to claim 1, wherein the axial fixation, between the upper and the lower parts (20, 21) of the kingpin (4) and the spring carrier (16), is achieved via pins and screws, through which the spring carrier (16) is connected with the upper and the lower parts (20, 21).

5. The independent wheel suspension according to claim 1, wherein the spring carrier (16) is a two-piece part, and after assembly, when the two parts of the spring carrier (16) are connected with each other, a continuous bar (32) is formed.

6. The independent wheel suspension according to claim 1, wherein transverse link joints (7, 11) of the upper and the lower transverse link (10, 14) are roller bearings, and ends of the upper and the lower parts (20, 21) of the kingpin (4), facing away from the spring carrier (16), each have one of a housing (38, 39), a joint head or the transverse link joints (7, 11).

7. The independent wheel suspension according to claim 6, wherein the housing (38, 39), together with the respective one of the upper and the lower parts (20, 21), is a one-piece part.

8. The independent wheel suspension according to claim 1, wherein one of a ball joint head or a molecular joint head (44) is integrated at an end of each of the upper and the lower parts (20, 21) of the kingpin (4), facing the respective transverse link (10, 14).

9. The independent wheel suspension according to claim 8, wherein the upper and the lower parts (20, 21) of the kingpin (4) are connected via a bolt (45) and a nut (46).

10. The independent wheel suspension according to claim 8, wherein a screw (45) extends through one of the upper and the lower parts (20, 21) and is screwed into the thread (47) of the other of the upper and the lower parts (20, 21) of the kingpin (4).

11. The independent wheel suspension according to claim 8, wherein the axial fixation, between of the upper and the lower parts (20, 21) and between the spring carrier (16), is achieved such that the ends of the upper and the lower parts (20, 21), positioned in the spring carrier (16), are a truncated cone and are positioned in the spring carrier (16) to formlock, and of the upper and the lower parts (20, 21) are coupled together by a bolt (45) and a nut.

12. An independent wheel suspension with a steering knuckle (1) which rotates about a rotational axis (5) and being supported on a spring carrier (16), which is connected with a frame of a vehicle by one of a damper (18) and an air spring (19) or a spring-damper-module (17), the steering knuckle (1) being connected with the spring carrier (16) via a kingpin (4), the independent wheel suspension comprises at least an upper transverse link (10), positioned at an upper end of the kingpin (4), and at least a lower transverse link (14), positioned at a lower end of the kingpin (4), the steering knuckle (1) and the upper and the lower transverse links (10, 14) being pivotally positioned in relation to the kingpin (4) and the spring carrier (16) is connected with the kingpin (4) in a rotationally fixed manner, the kingpin (4) being a connecting link for the spring carrier (16), the steering knuckle (1), and the upper and the lower transverse links (10, 14), and the kingpin (4) being a two-piece part and comprises an upper part (20) and a lower part (21), at least an end of the upper part (20), adjacent the lower part (21), and an end of the lower part (21), adjacent the upper part (20), being enclosed within an axial cylindrical opening within the spring carrier (16), and the end of the upper part (20), adjacent the lower part (21), and the end of the lower part adjacent the upper part (20), and corresponding locations in the spring carrier (16) each including at least one transverse opening (30A) for receiving a corresponding locking element (30), each transverse opening (30A) extending parallel to and offset from a diameter of the upper part (20) and lower part (21) and the spring carrier (16), each transverse opening (30A) extending from a first external circumferential area of a wall of the spring carrier (16) and through the corresponding one of the first and second parts (20, 21) and at least into a corresponding opposing region of the spring carrier (16) wall, and each locking element (30) being one of a pin and a screw, whereby engagement of the locking elements (30A) with the transverse openings (30) through the spring carrier (16), the end of the upper part (20), adjacent the lower part (21), and the end of the lower part (21), adjacent the first part (20) axially and rotationally secure the upper part (20), the lower part (21) and the spring carrier (16) with respect to each other.

13. The independent wheel suspension according to claim 12, wherein each part of the two-piece spring carrier (16) is designed as a half cylinder in an area around the kingpin (4).

14. The independent wheel suspension according to claim 12, wherein an additional axial fixation between the upper and the lower parts (20, 21) of the kingpin (4) and between the spring carrier (16) is achieved in so that each of the upper and the lower parts (20, 21) has a ring groove (36), at an end facing the other part, into which a bar (37) of the spring carrier (16) engages, in each case, such that the two parts of the spring carrier (16) form a continuous bar (37) when the two parts of the spring carrier (16) are joined together.

* * * * *